United States Patent
Garrett et al.

(10) Patent No.: US 8,920,520 B2
(45) Date of Patent: Dec. 30, 2014

(54) METHODS OF PREPARING POLYSACCHARIDE SHEETS FOR ESTERIFICATION

(75) Inventors: Thomas S. Garrett, Narrows, VA (US); Lawton E. Kizer, Blacksburg, VA (US); Henry P. Stogner, Bluefield, WV (US)

(73) Assignee: Celanese Acetate LLC, Irving, TX (US)

( * ) Notice: Subject to any disclaimer, the term of this patent is extended or adjusted under 35 U.S.C. 154(b) by 234 days.

(21) Appl. No.: 13/409,600

(22) Filed: Mar. 1, 2012

(65) Prior Publication Data

US 2013/0231419 A1    Sep. 5, 2013

(51) Int. Cl.
C08L 1/10 (2006.01)
D21H 17/18 (2006.01)

(52) U.S. Cl.
USPC .............. 8/120; 8/116.1; 524/35; 524/37; 162/177

(58) Field of Classification Search
USPC ............................................................ 8/120
See application file for complete search history.

(56) References Cited

U.S. PATENT DOCUMENTS

| | | | |
|---|---|---|---|
| 3,482,011 A | 12/1969 | Bohrer | |
| 4,983,730 A | 1/1991 | Domeshek et al. | |
| 5,036,900 A * | 8/1991 | Burley et al. | 162/9 |
| 5,114,535 A | 5/1992 | Burley et al. | |
| 6,748,671 B1 | 6/2004 | Vrbanac et al. | |
| 6,769,199 B2 | 8/2004 | Vrbanac et al. | |
| 6,862,819 B2 | 3/2005 | Vrbanac et al. | |
| 6,865,822 B2 | 3/2005 | Vrbanac et al. | |
| 6,910,285 B2 * | 6/2005 | Vrbanac et al. | 34/576 |
| 7,291,244 B2 | 11/2007 | DeZutter et al. | |
| 7,334,347 B2 | 2/2008 | Mann et al. | |
| 7,396,435 B2 | 7/2008 | DeZutter et al. | |
| 2004/0253440 A1 * | 12/2004 | Kainth et al. | 428/357 |
| 2005/0042470 A1 * | 2/2005 | Vogler et al. | 428/536 |
| 2005/0227072 A1 * | 10/2005 | Nijman | 428/403 |

OTHER PUBLICATIONS

"Flash Drying" by Darren A. Traub, published Jun. 1, 2001 and accessed online on the Process Heating website: http://www.process-heating.com/articles/print/86597-flash-drying, pp. 1-3 on an attached PDF.*

* cited by examiner

*Primary Examiner* — Harold Pyon
*Assistant Examiner* — Katie L Hammer
(74) *Attorney, Agent, or Firm* — McDermott Will & Emery LLP; Jaimes Sher (57) ABSTRACT

Processing of cellulose, and more particularly, fiber opening and downstream processing and chemistry are provided. A process includes moistening a cellulose sheet stock to a water content in a range from about 20% to about 50%, attriting the moistened cellulose sheet to a wet pulp, flash drying the wet pulp to a floccule of cellulose having a moisture content from about 4% to about 8%, and esterifying the floccule of cellulose to provide a cellulose ester product.

23 Claims, 3 Drawing Sheets

METHODS OF PREPARING POLYSACCHARIDE SHEETS FOR ESTERIFICATION

BACKGROUND

The present invention relates to processing of cellulose, and more particularly, to fiber opening and downstream processing and chemistry.

The functionalization of cellulose from sheet and roll forms generally begins with an opening step to prepare the fibers for downstream processing and chemistry. In the context of downstream acetylation to prepare various cellulose acetate products, in particular, cellulose is often sourced from hardwood and softwood pulps and cotton linters.

Several factors introduce limitations at various stages in cellulose processing. Sheet hardness is one such factor that can influence the fiber opening. For example, employing standard attrition equipment used in the art, a hardness index of a pulp feed should be less than about 3 psi/mil. The Mullen burst test, which measures the pressure required to puncture a cellulose sheet or paperboard as a function of its load carrying capacity under specific conditions, also provides an indication of whether the cellulose feed will perform well in the equipment.

It has been indicated that the fiber-opening step can be improved using polar liquids, in particular water. While water is well suited for the fiber-opening step, especially in view of concerns for providing green chemical processes, its presence in the milled pulp product can impede downstream chemistries. For example, in the acetylation process, water can consume the acetylation reagent acetic anhydride, leading to inefficient consumption of this reagent. Attempts to improve processing for downstream chemistries have led to milled products lacking consistent and reliable moisture content. Drying attempts often lead to under dried, over dried, or unevenly dried product, which influences quality of product at the functionalization stage.

SUMMARY OF THE INVENTION

The present invention relates to processing of cellulose, and more particularly, to fiber opening and downstream processing and chemistry.

In some aspects, embodiments disclosed herein relate to a process comprising moistening a cellulose sheet stock to a water content in a range from about 20% to about 50%, attriting the moistened cellulose sheet to a wet pulp, flash drying said wet pulp to a floccule of cellulose having a moisture content from about 4% to about 8%, and esterifying the floccule of cellulose to provide a cellulose ester product.

In other aspects, embodiments disclosed herein relate to a process comprising: (a) moistening a cellulose sheet stock to a water content in a range from about 20% to about 50%; then (b) attriting the moistened cellulose sheet to a wet pulp; then (c) flash drying the wet pulp to a floccule of cellulose having a moisture content from about 5% to about 8%; then (d) esterifying the floccule of cellulose to provide a cellulose ester product; and then (e) forming a fiber tow from said cellulose ester product.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to those skilled in the art and having the benefit of this disclosure.

DETAILED DESCRIPTION

The present invention relates to processing of cellulose, and more particularly, to fiber opening and downstream processing and chemistry.

Of the many advantages, the present invention provides processes that subject stock cellulose to a fiber opening/attritioning with the aid of water followed by drying to achieve a more even moisture content, while avoiding over drying or under drying of the attrited cellulose product. The moisture content of the resultant cellulose floccule is in a range that is compatible with downstream process chemistries including, for example, esterification.

Unlike many cellulose handling processes employing fiber opening, attrition milling, and the like, processes of the invention can effect such fiber manipulations in the presence of water alone, without the need for various additives commonly employed in the art, such as surfactants. Thus, processes of the invention effect fiber manipulation in a manner that is environmentally friendly. While such handling processes obviate the need for additives, processes of the invention can utilize any additives known in the art at the user's discretion, including, for example, surfactants, crosslinkers, hydrophobic materials, mineral particulates, plasticizers, foams, and the like. Such additives can be selected based on the target end use of the cellulose product, but are not necessary to effect the aforementioned fiber opening/attritioning.

The various steps in processes of the invention are readily integrated into a single system for producing functionalized cellulose end products, such as cellulose esters, exemplified by cellulose acetate. For example, the cellulose floccule generated in the flash drying process of the invention can be fed into a cyclone separator and the resultant separated cellulose floccule product charged directly into a reactant vessel for chemical functionalization, reducing the amount of handling of material as well as reducing atmospheric exposure.

Processes of the invention are compatible with the use of hard cellulose sheets of lower cost than are typically employed in the art, while providing an intermediate well-attritioned cellulose floccule of low density suitable for further chemical functionalization. The conditions for attritioning and drying the cellulose are sufficiently gentle that fiber damage is minimized. Given the guidance provided herein, other advantages will be apparent to the skilled artisan.

In some embodiments, the present invention provides a process comprising moistening a cellulose sheet stock to a water content in a range from about 20% to about 50%, attriting the moistened cellulose sheet to a wet pulp, flash drying the wet pulp to a floccule of cellulose having a moisture content from about 4% to about 8%, and esterifying said floccule of cellulose to provide a cellulose ester product.

As used herein, the term "moistening" refers to the process of adding water to a cellulose stock to a target water content by weight percent. Moistening can be accomplished by any means commonly employed in the art, for example, moistening can be accomplished by dip or spray techniques. When moistening cellulose stock using spray techniques, spraying can include spraying on one side or both sides of the sheet. In some embodiments, moistening can also be accomplished after an initial cutting or reducing in size of the bulk cellulose stock, including moistening of narrow strips, small planks, or other smaller fragments made by initial cutting or tearing of the sheet.

In some embodiments, moistening of cellulose stock is performed to provide a moistened cellulose sheet stock having a water content in a range from about 20% to about 50% by weight. In some embodiments, the moistened cellulose stock has a water content in a range from about 30% to about 40%. In some embodiments, the moistened cellulose sheet stock has a water content in a range from about 20% to about 25%. In some embodiments, the moistened cellulose stock has a water content in a range from about 25% to about 30%. In some embodiments, the moistened cellulose stock has a water content in a range from about 30% to about 35%. In some embodiments, the moistened cellulose stock has a water content in a range from about 35% to about 40%. In some embodiments, the moistened cellulose stock has a water content in a range from about 40% to about 45%. In some embodiments, the moistened cellulose stock has a water content in a range from about 45% to about 50%. In some embodiments, the moistened cellulose stock has a water content of about 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, and 50%, including any fraction thereof.

One skilled in the art will recognize that the exact choice of weight percent of moisture can depend on the cellulose sheet source selected. As a general guideline, the moisture content should be sufficient to affect fiber opening and facilitate the downstream attriting process. Below about 15% moisture content, many sources of cellulose sheet stock may not exhibit sufficient fiber opening. Likewise, more than about 55% moisture content can lead to problems with the downstream flash drying process, including for example, product that is over dried, under dried or unevenly dried. Assessment of appropriate moisture content for a given cellulose stock can be evaluated by numerous means, including for example, evaluating the effectiveness of attrition or determining the yield/efficiency of downstream chemistries, such as esterification yields. Other means of evaluating the effectiveness of methods of the invention include visual inspection of dried attritioned pulp and/or quantitative determination of moisture content by a suitable analytical test, as known by those skilled in the art.

As used herein, the term "cellulose stock" or "pulp" refers to any number of commercially available or readily produced cellulose in the form of sheets, bales, or other forms and combinations. Cellulose is typically sourced from plant species that are characterized as hardwood, softwood, or cotton. Such pulps include, without limitation, abaca pulp, acetate pulp, agricultural residue pulp made from agricultural residue such as straw, bagasse and the like, alpha pulp, aspen hardwood kraft pulp, bamboo pulp, birch hardwood kraft pulp, bisulfite chemi mechanical pulp (BCMP), bleached chemo thermo mechanical pulp (BCTMP), bleached eucalyptus kraft pulp (BEKP), bleached kraft pulp (BKP), brown pulp, chemical pulp, chemi-groundwood pulp (CGP), chemi-mechanical pulp (CMP), chemi-refiner mechanical pulp (CRMP), chemo-thermo-mechanical pulp (CTMP), cold soda pulp, cotton linters, cotton pulp, deinked pulp (DIP), dissolving pulp, esparto pulp, ethers pulp, eucalyptus pulp, flax pulp, fully bleached pulp, groundwood pulps (GWP) or stone groundwood pulp (SGWP), hard cooked pulp, hard wood (beech) sulfite pulp, hemp pulp, hot groundwood pulp or thermo groundwood, jute pulp, kenaf pulp, knotter pulp, kraft pulp, market pulp, mechanical pulp, micro crystalline cellulose pulp, neutral sulfite or mono-sulfite pulps, neutral sulfite semi chemical (NSSC), nitration pulps, northern bleached hardwood kraft pulp (NBHKP), northern bleached softwood kraft pulp (NBSKP), northern mixed hardwood kraft pulp, non wood pulp made from non-wood plant material such as straw, grasses, rag, and the like, paper grade pulp, pressurized groundwood pulp (PGW), pressurized refiner mechanical pulp (PRMP), radiata pine soft wood kraft pulp, rag pulp, recycled fiber pulp, refiner mechanical pulp (RMP), refiner sawdust pulp, reinforcement pulp, sawdust pulp, scandinavian softwood kraft pulp, semi-alkaline pulp, semi-bleached pulp (SBP), semi-chemical pulp, semi-chemical mechanical pulp (SCMP), sisal pulp, soft cooked pulp, softwood pulp, softwood sulfite pulp, southern bleached hardwood kraft pulp (SBHKP), southern bleached softwood kraft pulp (SBSKP), southern mixed hardwood kraft pulp, southern pine soft wood kraft pulp, specialty pulp, straw pulp, tandem thermo mechanical pulp (tandem TMP), thermo chemi-mechanical pulp (TCMP), thermo mechanical pulp (TMP), totally chlorine free (TCF), unbleached softwood kraft (UBSK), un-washed pulp, viscose pulp or rayon grade pulp, washed pulp, wood-free pulp, and wood pulp. Any biological sources of cellulose can also be used.

In some embodiments, processes of the invention employ moistening of the cellulose that comprises treatment with de-mineralized water. As described above, processes of the invention advantageously effect fiber opening/mechanical manipulation of the fibers with water alone, without the need for further additives, such processes being a function of using the appropriate amount of water to generate the moistened cellulose stock and obviating the need for surfactants or other additives commonly employed to chemically or mechanically manipulate cellulose fibers. In some embodiments, additives can nonetheless be employed during the moistening process for certain targeted downstream applications of the fiber, including surfactants, crosslinkers, hydrophobic materials, mineral particulates, plasticizers, foams, inks, flavorants, and antibacterial agents. In some such embodiments, where downstream esterification is to be effected, the choice of additives are selected for compatibility with the esterification conditions.

In some embodiments, processes of the invention include an attriting step. As used herein, "attriting" refers to a process that reduces the size of the cellulose stock to a mass of pulp. In some such embodiments, the mass of pulp is a wet pulp. In some embodiments, the attriting process can also break down individual cellulose fibers into smaller sizes. In some embodiments, processes of the invention include an attriting step which comprises shredding the cellulose stock into small fragments and further attriting the small fragments into a wet pulp. In some embodiments, attriting is performed after moistening the cellulose sheet stock. In some embodiments, a portion of the attriting process is performed prior to moistening the cellulose stock. In some embodiments, the attriting process provides a wet pulp that can be delivered to a flash drying station for further possessing. In some embodiments, the attriting process provides a wet pulp that can be delivered to a pre-treatment station prior to flash drying. In such a pre-treatment station, any of the aforementioned additives may be mixed into the wet pulp.

Figure 1:
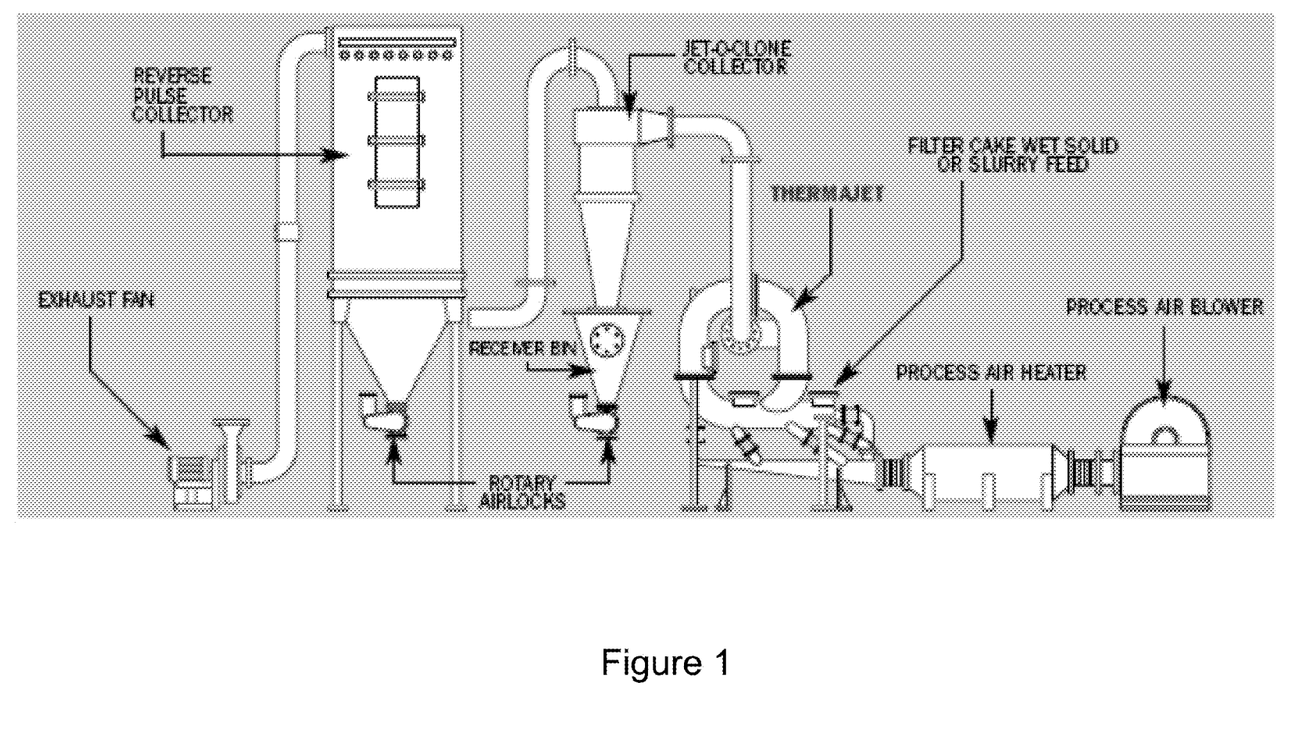
FIG. 1 shows an embodiment of a flash dryer used in processes of the present invention.
Figure 2:
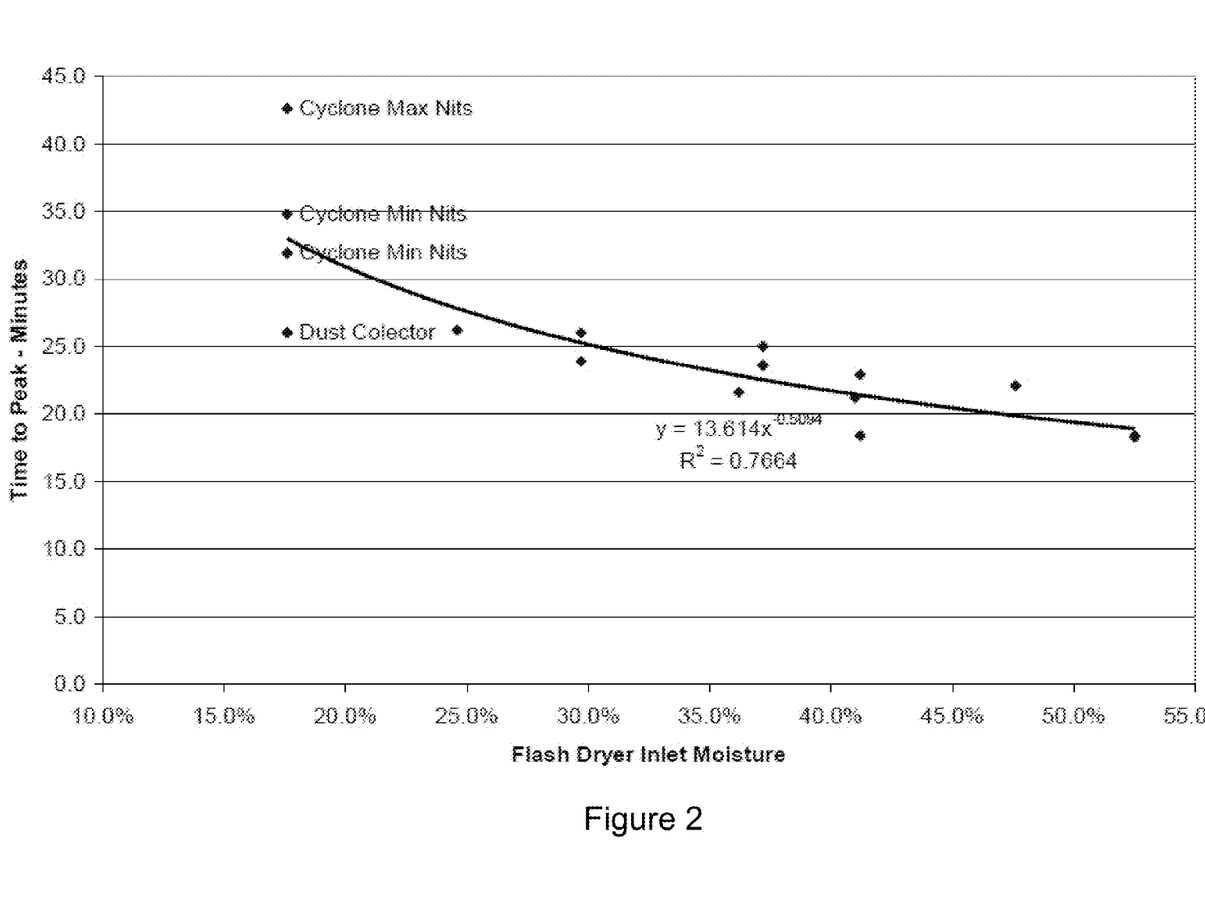
FIG. 2 shows a plot of time to peak versus flash dryer inlet moisture for all samples collected.
Figure 3:
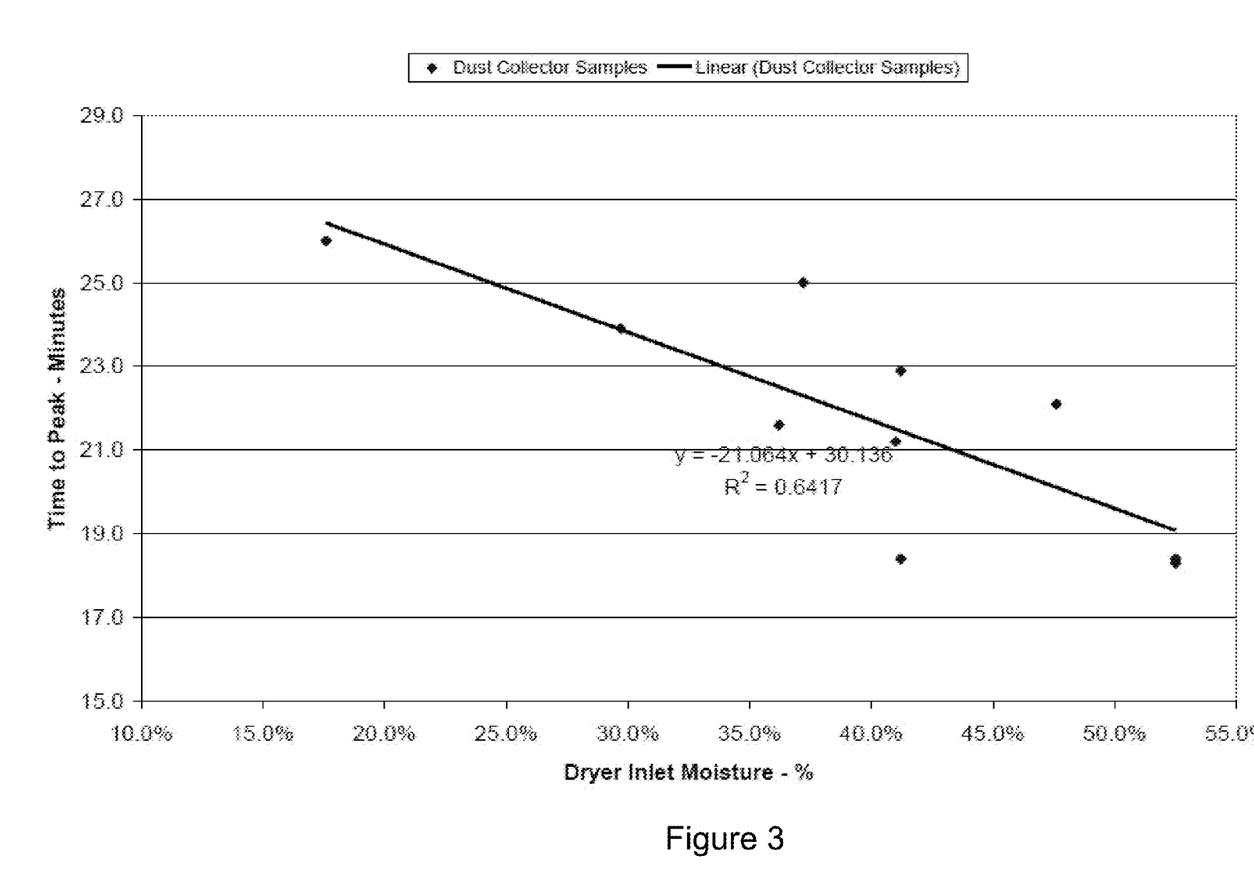
FIG. 3 shows a plot of time to peak versus flash dryer inlet moisture for only samples from the dust collector.

In some embodiments, following attriting of the moistened cellulose, the resultant wet pulp is subjected to flash drying. In some embodiments, the flash dryer is based on a toroidal jet milling technology, for example, the ThermaJet flash dryer (Fluid Energy, Telford Pa.) using a low-pressure hot gas to dry and deagglomerate the wet pulp. See, for example, FIG. 1. A hot gas is introduced into the flash dryer through nozzles to create a high velocity, rotating gas/product stream. The gas stream rapidly sweeps the incoming wet pulp material into the drying chamber where the turbulent hot air quickly deagglomerates the wet pulp by creating particle-to-particle collisions. These collisions increase the surface area exposed to the drying medium, facilitating the rapid heat exchange for effective flash drying. From the drying zone, the gas/product stream enters into a static classification zone. Due to centrifugal force, the larger, wetter, particles remain to the outside of the dryer ring, where they will be recirculated into the drying chamber. The lighter, dryer particles are removed with the exhaust gas stream.

In some embodiments, flash drying can be conducted at a temperature in a range from about 105° C. to about 200° C. at a feed inlet of the flash dryer and a temperature in a range from about 60° C. to about 130° C. at an outlet of the flash dryer. In some embodiments, the feed inlet temperature of the flash dryer is in a range from about 100° C. to about 120° C. In some embodiments, the feed inlet temperature of the flash dryer is in a range from about 120° C. to about 140° C., from about 140° C. to about 160° C., from about 160° C. to about 180° C., or from about 180° C. to about 200° C., including any nested range therebetween and fractions thereof. Likewise, in some embodiments, the feed outlet temperature of the flash dryer is in a range from about 60° C. to about 80° C. In some embodiments, the feed outlet temperature of the flash dryer is in a range from about 80° C. to about 100° C., from about 100° C. to about 120° C., from about 120° C. to about 140° C., or from about 140° C. to about 160° C., including any nested range therebetween and fractions thereof. The operational temperature parameters can impact the final moisture content and density of the dried cellulose floccule that results from the flash drying process.

In some embodiments, flash drying is conducted with a low-pressure hot gas. For example, in some embodiments, low pressure measured as nozzle supply pressure is in a range from between about 2 to about 4 psig, including 1, 2, 3, and 4 psig and fractions thereof. In some embodiments, flash drying is conducted with hot air. In some embodiments, the flash drying step is conducted with air that is heated directly or indirectly. It has been indicated that heating in direct mode can lead to some degree of coloration of the resultant cellulose floccule. Where color of product is important, heat can be supplied to the air delivered to the flash dryer indirectly to reduce such coloration.

In some embodiments, processes of the present invention employ a separation step that can selectively remove the product cellulose floccule of a particular density while removing fines and other undesired particulate matter. In some embodiments, such separation of the floccule of cellulose can be effected by means of a cyclone separator. The cyclone separator can be readily interfaced with the flash dryer upstream as well as providing optional direct delivery of the separate cellulose floccule to a reaction vessel for subsequent functionalization chemistry.

In some embodiments, processes of the present invention further include an esterification step that comprises treatment with acetic anhydride, propionic anhydride, butyric anhydride, a mixed anhydride, and combinations thereof. Esterification of cellulose can be accomplished using methods known in the art. For example, acetylation can be accomplished by reacting the cellulose floccule with acetic anhydride in the presence of a mixture of acetic acid and sulfuric acid. In some embodiments, the esterification step includes treatment with any acid anhydride to provide an esterified cellulose floccule. In some embodiments, the esterification step includes treatment with acetic anhydride to provide a cellulose acetate product.

Partial esterification of cellulose is known in the art. This provides access to mixed esterified products by reaction with multiple esterification reagents. Thus, in some embodiments, process of the invention includes the use of a first esterification reagent to generate a first esterified product in which not all the available hydroxyl groups are reacted with the first esterification reagent. The first esterified product can then be subjected to a second esterification to provide a mixed esterified cellulose floccule. In some embodiments, the first esterification reagent is acetic anhydride and the second esterification reagent is a long chain fatty acid anhydride, that is a branched or unbranched, saturated or unsaturated fatty acid comprising between about 7 to about 30 carbon atoms. In some embodiments, the first esterification reagent is a long chain fatty acid anhydride, that is a branched or unbranched, saturated or unsaturated fatty acid comprising between about 7 to about 30 carbon atoms and the second esterification reagent is acetic anhydride.

In some embodiments, processes of the invention employing esterification with acetic anhydride can be used to generate cellulose acetate products as known in the art, for example, cellulose diacetate or cellulose triacetate. In some embodiments, processes of the invention can be used to produce a cellulose acetate having any degree of substitution from about 0.1 to about 3 acetate groups per monomer unit. That is, an average of less than one up to all available hydroxyl groups on the monomer unit glucose that makes up the cellulose polymer. In some such embodiments, the process is used to produce cellulose diacetate. In some such embodiments, the process is used to produce cellulose triacetate.

Cellulose acetate products accessible through processes of the invention can include acetate flake, acetate tow and acetate film. Cellulose acetate flake can be converted into a wide range of products from tough, clear, impact-resistant plastics to soft, drapeable, absorbent fabrics. Cellulose acetate fiber tow can be made from acetate flake. In some embodiments, processes of the invention further include forming a fiber tow from a cellulose ester product. In some such embodiments, the fiber tow comprises cellulose acetate. The tow generated can be selected for the exact combination of denier per filament (dpf), total denier, and other physical properties that depend on the end use of the tow material.

In some embodiments, cellulose acetate films can be formed from cellulose acetate products of the invention. Such films can be used for print-lamination, carton windows, package wrapping products, and numerous other industrial applications such as use high-end food products, cosmetics and pharmaceuticals.

In some embodiments, the process is used to produce fiber grade cellulose acetate. Fiber grade cellulose acetate comprises cellulose acetate having an acetyl value (AV) in a range from about 45 to about 58. In other embodiments the acetyl value can have a range from about 54 AV to about 56 AV. In some embodiments, the acetyl value is about 53, about 54, about 55, about 56, or about 57, including fractions thereof. Acetyl value is a measure of the degree of esterification of cellulose in acetate or triacetate products, and indicates the percentage of total weight that is acetic acid. A manufactured fiber from cellulose acetate is prepared from cellulose acetate flake which is precipitated, purified, dried, and dissolved in a solvent such as acetone to prepare a spinning solution. After filtration, the highly viscous solution is extruded through spinnerets into a column of warm air in which the solvent is evaporated, leaving solid continuous filaments of cellulose acetate. The evaporated acetone is recovered using a solvent recovery system to prepare additional spinning solution. The cellulose acetate fibers can be intermingled and wound onto a bobbin or shippable metier cheese package, ready for use without further chemical processing. In the manufacture of staple fiber, the filaments from numerous spinnerets are combined into tow form, crimped, cut to the required length, and packaged in bales.

In some embodiments, the process is used to produce water-soluble cellulose acetate. Water-soluble cellulose acetate is described, for example, in U.S. Pat. No. 3,482,011 and U.S. Pat. No. 4,983,730, both of which are incorporated herein by reference in their entirety. The term water-soluble cellulose acetate is understood by persons skilled in the art to refer to cellulose acetate, which dissolves in water relatively quickly, and without leaving substantial amounts of insoluble residues. Typically, water-soluble cellulose acetate has a degree of substitution ranging from about 0.5 to about 0.9 or from about 0.6 to about 0.8 acetate groups per monomer unit. It is to be recognized that "degree of substitution" is just one of several conventional ways used to describe the type of cellulose acetate that is water-soluble. Other common ways to describe this type include measuring the acetyl value or acetyl content, measured as weight percent acetic acid or weight percent acetyl, respectively. In addition, it is recognized that a cellulose acetate composition that is soluble in water will be soluble in other organic solvents such as formamide, N,N-dimethyformamide, dimethyl sulfoxide, pyridine, and N-methyl-2-pyrrolidone, mixtures thereof and mixtures thereof with water.

In some embodiments, processes of the invention further include incorporating the cellulose ester product or tow thereof in composite matrix comprising one selected from the group consisting of a thermoplastic and a thermoset. Cellulose ester products or tows thereof incorporated in a matrix material form a composite. Exemplary matrix materials can include, without limitation, an epoxy, a polyester, a vinylester, a polyetherimide, a polyetherketoneketone, a polyphthalamide, a polyetherketone, a polytheretherketone, a polyimide, a phenol-formaldehyde, and a bismaleimide. Matrix materials useful in the present invention can include any known matrix materials (see Mel M. Schwartz, Composite Materials Handbook (2d ed. 1992)). Matrix materials more generally can include resins (polymers), both thermosetting and thermoplastic, metals, ceramics, and cements.

Thermosetting resins useful as matrix materials include phthalic/maelic type polyesters, vinyl esters, epoxies, phenolics, cyanates, bismaleimides, and end-capped polyimides (e.g., PMR-15). Any thermoset matrix can be utilized including the industry standard epoxy and polyester family groups, in addition to phenolics, silicones, polyimides, and the like. Polyester resin can be used, for example, for the creation of bulk-molding compound (BMC) or sheet molding compound (SMC) which incorporate chopped or continuous functionalized cellulose fibers, pre-mixed with the resin. Thermoplastic resins include polysulfones, polyamides, polycarbonates, polyphenylene oxides, polysulfides, polyether ether ketones, polyether sulfones, polyamide-imides, polyetherimides, polyimides, polyarylates, and liquid crystalline polyester.

In some such embodiments, the esterified cellulose fiber material, floccule or tow form, can be incorporated by methods known in the art for composite manufacture. In some embodiments, the esterified cellulose fiber material is incorporated into a thermoset matrix through various techniques, including, but not limited to, chopped fiber layup, resin transfer molding and wet winding, vacuum assisted resin transfer molding (VARTM), and prepreg manufacture. Any current technique that is used to incorporate cellulose ester fiber for use as a composite structure can be used for the incorporation of fiber tows of the invention. Esterified cellulose fiber materials are incorporated into a thermoplastic matrix through various techniques, including, but not limited to, impregnation with a fully polymerized thermoplastic matrix through melt or solvent impregnation or intimate physical mixing through powder impregnation or commingling of esterified cellulose fiber materials with matrix fibers. Any technique that is used to esterified cellulose fibers in a composite is a viable option. Such methods can be used in conjunction with any thermoplastic matrix including polypropylenes, polyethylenes, polyamides, polysulfones, polyetherimides, polyetheretherketones, and polyphenylene sulfides, for example.

In some embodiments, the present invention provides a fully integrated process for producing cellulose ester fiber tows, such as cellulose acetate. Such a process includes (a) moistening a cellulose sheet stock to a water content in a range from about 20% to about 50%; (b) attriting the moistened cellulose sheet to a wet pulp; where step (b) is performed sequentially after step (a); (c) flash drying said wet pulp to a floccule of cellulose having a moisture content from about 5% to about 8%; (d) esterifying said floccule of cellulose to provide a cellulose ester product; and (e) forming a fiber tow from said cellulose ester product. Each of steps (a) through (e) are as described above.

To facilitate a better understanding of the present invention, the following examples of preferred embodiments are given. In no way should the following examples be read to limit, or to define, the scope of the invention.

EXAMPLE

In order to evaluate flash drying as an effective pulp opening step, trials were run to generate opened wood pulp for later evaluation on laboratory scale acetylation equipment. In order to simulate a commercial flash drying process, a water addition system with spray nozzles was installed ahead of a pilot-scale pre-shredder and Sprout Waldron attrition mill to treat three inch wide strips of wood pulp sheet. This configuration allowed the wood pulp feed rate to be varied between about 6.14 and about 27.96 Kg/hr dry pulp and the pulp moisture at the dryer inlet to vary between about 17.6% and about 52.5% moisture. The configuration allowed stable operation of the flash dryer for runs in excess of 25 minutes. Runs were made with variable starting parameters and initial quality evaluation was based on visual observation of the opened wood pulp. Throughput was linked to the speed of the pre-shredder and the capacity of the water pump supplying the spray nozzles. All pulp was fed to a four inch Fluid Energy Flash Dryer (Model 4). Outlet pulp moistures ranged from about 5.5% to about 8% with a target of 7%.

Runs were initially planned at two feed rates, 11.34 and 22.68 Kg/Hr (25 and 50 Lb/Hr) (wet basis) with pulp moistures of 28.5% and 45.4%. Calculations showed that to maintain reasonable linear speeds on the wood pulp through the system a strip width of three inches should be selected. In order to generate the quantity of pulp needed, a consistent three inch width, a set of rolls were fabricated to produce three inch strips from the commercially available pulp rolls. This configuration was used to generate trial quantities of three types of wood pulp, a commercial Viscose grade wood pulp (VG), a commercial Acetate grade wood pulp (AG) and a third commercially available pulp. The third pulp was used to get the system (wetting, attritioning, and drying) on target prior to running the other pulps in order to minimize the total amounts required.

Dry pulp feed rate was varied by changing the feed roll speed into the pre-shredder. This was accomplished in two ways. The feed roll has a mechanical variable speed drive allowing the feed roll speed to be adjusted independently of the shredding roll. In addition a variable frequency drive was installed on the feed roll and pre-shredder roll motors. Changing the feed roll speed only changed the particle size produced by the pre-shredder and runs indicated a loss of filterability in the acetate flake produced at low feed roll speeds and normal pre-shredder roll speeds. Drive frequency control was the primary method of speed control with the mechanical feed roll speed adjustment used to "fine tune" the pulp feed speed at a given drive frequency.

Pulp inlet moisture was varied by spraying water onto both sides of the pulp strip just prior to the pre-shredder feed rolls. The spray nozzles used were Spraying System Co 1/4J series with fluid cap #2850 and air cap #73320. The spray pattern for these nozzles is controlled by adjusting both the water supplied to the nozzle and the air pressure also supplied to the nozzle. Demineralized water was supplied to the nozzles by an FMI variable flow pump. For the trial set-up a much higher percentage of overspray was used as compared to a full scale application. In order to insure the edges of the strip were fully wetted the spray pattern was set up to extend about one inch beyond the edge of the strip. An about five inch spray pattern for a three inch wood pulp strip prevented using the water flow rate as an estimate of final wetted pulp moisture.

In order to minimize the variations in feed rate to the dryer, the wetting system, pre-shredder and attrition mill were stacked to allow them to gravity feed to each other and also to the dryer. This configuration also minimized the amount of time available for the pulp moisture to reach equilibrium. In a commercial system the time between adding the additional moisture to the wood pulp and entering the flash dryer may be limited by the distance between the equipment and the transfer rate (ft/sec). Allowing the wood pulp to reach moisture equilibrium may allow the system to operate at a minimum average moisture level. The minimum moisture level determined from these trials may serve as a conservative estimate, i.e., higher than that needed in a commercial system with slightly longer residence time between the water addition and the inlet to the dryer.

A standard rotary valve at the dryer inlet was used to meter the wetted and attritioned pulp into the four inch Fluid Energy dryer (Fluid Energy Processing and Equipment Company, Telford, Pa.). This rotary valve provided a seal between the two portions of the process but was able to carry the air from the attrition mill into the dryer rather than venting it into the room. Fluid Energy provided a cyclone followed by a dust collector at the dryer discharge to collect the dried pulp. The cyclone was not sized to remove the low density pulp and the bulk of the material was carried over into the dust collector. The cyclone appeared to collect that material which had not been fully opened.

Operating conditions for those runs deemed successful based on visual evaluation of the opened wood pulp are shown in Table 1 below. Feed Rates are included in the table but are for reference only. Inlet moisture, Dryer inlet and outlet temperature and the dryer operating pressure are the variables that can be controlled to achieve the desired results. Feed rates can be varied to meet process/production requirements.

TABLE 1

| Run | Pulp | Feed Rate KG/Hr (Wet) | Target Inlet % Water | Measured Inlet % Water | Dry Pulp Wt- Kg/Hr | Feed Rate In/Sec | Dryer Inlet Temp °F. | Dryer Outlet Temp °F. | Dryer Operating Pressure PSIG |
|---|---|---|---|---|---|---|---|---|---|
| 1 | VG | 29.26 | 38.1% | 38.7% | 18.12 | 3.25 | 260 | 200 | 4 |
| 2 | VG | 29.26 | 38.1% | 38.4% | 18.12 | 3.25 | 330 | 220 | 4 |
| 3 | VG | 29.26 | 38.1% | 34.9% | 18.12 | 3.25 | 280 | 155 | 4 |
| 4 | VG | 29.26 | 38.1% | 34.9% | 18.12 | 3.25 | 300 | 170 | 4 |
| 5 | VG | 29.26 | 38.1% | 37.8% | 18.12 | 3.25 | 260 | 160 | 4 |
| 6 | VG | 38.72 | 38.1% | 27.7% | 23.98 | 4.30 | 260 | 160 | 4 |
| 7 | VG | 38.72 | 38.1% | 22.8% | 23.98 | 4.30 | 240 | 150 | 4 |
| 8 | VG | 38.72 | 38.1% | 31.1% | 23.98 | 4.30 | 280 | 175 | 4 |
| 9 | VG | 38.72 | 38.1% | 27.7% | 23.98 | 4.30 | 280 | 174 | 4 |
| 10 | AG | 38.72 | 38.1% | 37.3% | 23.98 | 4.30 | 260 | 150 | 4 |

Based on visual appearance a number of samples from Table 1 above were used to produce acetate flake in a 1 kg laboratory scale reactor. Reaction conditions were adjusted to get two of the measured parameters within defined limits. Those controlled parameters were acetyl value (AV) and intrinsic viscosity (IV). Acetyl value and intrinsic viscosity indicate the polymer degree of substitution and molecular weight, respectively. AV was measured by NIR with the calibration based on wet chemistry titration. The IV measurement was made with a Viscotek or Cannon-Ubbelohde viscometer at 30° C. Samples were also tested for solution viscosity (6% Visc) in centipoise (cps) and two filterability tests, Plugging Value (PV) in gms/cm$^2$ and Particle Count (HIAC) in particles/mL. Higher PV and lower HIAC indicate improved flake filterability. PV was obtained by weighing the amount of CA flake dissolved in acetone/water that passes thru a constant area filter under a constant inlet pressure. Particle Count was measured using a commercially available instrument (Hach HIAC (High Accuracy Particle Counter), Grants Pass, Oreg.). Flake Moisture as percent was also tested by loss in weight as it used to complete other analyses. To generate enough material for additional testing multiple batches were produced from some of the runs. Table 2 shows the results from that evaluation.

TABLE 2

| Run # | Moisture | AV (%) | IV (dl/gm) | 6% Visc (cps) | PV (gm/cm$^2$) | HIAC (count/ml) |
|---|---|---|---|---|---|---|
| Run # 1 | 2.6 | 56.06 | 1.5620 | 91 | 67 | 10004 |

TABLE 2-continued

| Run # | Moisture | AV (%) | IV (dl/gm) | 6% Visc (cps) | PV (gm/cm²) | HIAC (count/ml) |
|---|---|---|---|---|---|---|
| Run # 2 | 2.7 | 55.64 | 1.7882 | 92 | 33 | 7252 |
| Run # 3 | 3.6 | 55.69 | 1.6524 | 87 | 25 | 9611 |
| Run # 4 | 2.5 | 55.72 | 1.6720 | 89 | 33 | 9141 |
| Run # 5 | 4.1 | 56.08 | 1.7635 | 99 | 51 | 7264 |
| Run # 6 | 2.8 | 55.78 | 1.6045 | 92 | 65 | 8353 |
| Run # 7 | 3.7 | 56.03 | 1.6253 | 89 | 23 | 9503 |
| Run # 8 | 2.6 | 56.50 | 1.7319 | 87 | 25 | 10166 |
| Run # 9-A | 2.2 | 55.86 | 1.7110 | 88 | 48 | 6885 |
| Run # 9-B | 4 | 55.54 | 1.6720 | 90 | | 11487 |
| Run # 9-C | 2.4 | 55.90 | 1.7074 | 111 | NA | 6941 |
| Run # 9-D | 4.5 | 55.61 | 1.6005 | 82 | NA | 5968 |
| Run # 9-E | 3.3 | 55.92 | 1.6796 | 104 | NA | 7669 |
| Run # 9-F | 3.2 | 55.62 | 1.6470 | 94 | NA | 6161 |
| Run # 9-G | 2.2 | 55.86 | 1.7110 | 88 | 48 | 6885 |
| Run # 9-H | 2.4 | 55.90 | 1.7074 | 111 | NA | 6941 |
| Run # 9-I | 4.5 | 55.61 | 1.6005 | 82 | NA | 5968 |
| Run # 9-J | 3.3 | 55.92 | 1.6796 | 104 | NA | 7669 |
| Run # 9-K | 3.2 | 55.62 | 1.6470 | 94 | NA | 6161 |
| Run # 9-L | 2.9 | 55.89 | 1.5592 | 76 | NA | 6294 |
| Run # 9-M | 4.3 | 55.82 | 1.8785 | 78 | NA | 6837 |
| Run # 9-N | 2.5 | 55.80 | 1.7383 | 85 | NA | 6942 |
| Run # 9-O | 2.9 | 55.76 | 1.8009 | 96 | NA | 8793 |
| Run # 9-P | 2 | 55.77 | 1.7429 | 89 | NA | 6665 |
| Run # 9-Q | 1.7 | 56.05 | 1.6718 | 89 | NA | 6101 |
| Run # 9-R | 0.74 | 55.45 | 1.6179 | 85 | NA | 6565 |
| Run # 9-S | 2.2 | 55.82 | 1.7110 | 93 | NA | 7500 |
| Run # 9-T | 2.1 | 55.51 | 1.6525 | 93 | NA | 7300 |
| Run # 9-U | 2.6 | 55.64 | 1.6698 | 93 | NA | 6767 |
| Run # 9-V | 2.3 | 56.07 | 1.6539 | 87 | NA | 7107 |
| Run # 9-W | 2 | 55.63 | 1.7553 | 87 | NA | 6909 |
| Run # 9-X | 2.9 | 55.75 | 1.6870 | 95 | NA | 9541 |
| Run # 10-A | 2 | 55.63 | 1.6224 | 83 | 46 | 7684 |
| Run # 10-B | 5.8 | 55.54 | 1.8009 | 88 | 55 | 6816 |

The flake produced using the Flash Drying opening process was compared to the flake produced from two alternate processes. One is the conventional dry opening process that is similar to the process currently used commercially and the other is a liquid phase pretreatment. A summary of that data is shown in Table 3 which shows that the quality of the flake made using the flash drying process is as good as or better than the other known processes.

TABLE 3

| Description | Moisture | AV (%) | IV (dl/gm) | 6% Visc (cps) | PV (gm/cm²) | HIAC (count/ml) |
|---|---|---|---|---|---|---|
| Conventional Process, VG pulp (N = 1) | 2.4 | 55.64 | 1.65 | N/A | 16 | 15040 |
| Liquid Phase Pretreatment, VG Pulp (N = 18) | 2.6 | 55.92 | 1.61 | 80 | N/A | 6999 |
| Average Run #9 Samples (N = 24) | 2.8 | 55.76 | 1.69 | 91 | 48 | 7169 |
| Average Run #10 Samples (N = 2) | 3.9 | 55.58 | 1.71 | 85.5 | 50.5 | 7250 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A process comprising:
   moistening a cellulose sheet stock to a water content in a range from about 20% to about 50%;
   attriting the moistened cellulose sheet to a wet pulp;
   flash drying said wet pulp to a floccule of cellulose having a moisture content from about 4% to about 8%, wherein flash drying is conducted in a flash dryer having an inlet temperature of about 105° C. to about 200° C. and an outlet temperature of about 60° C. to about 130° C.; and
   esterifying said floccule of cellulose to provide a cellulose ester product.

2. The process of claim 1, wherein moistening said cellulose sheet comprises treatment with demineralized water.

3. The process of claim 1, wherein attriting comprises the steps of:

shredding said cellulose sheet stock into small fragments; and attriting said small fragments into said wet pulp.

4. The process of claim 1, wherein flash drying is conducted with a low pressure hot gas, wherein said low pressure is in a range from between about 2 to about 4 psig.

5. The process of claim 1, wherein the flash drying step is conducted with air that is heated indirectly.

6. The process of claim 1, further comprising separating said floccule of cellulose in a cyclone separator.

7. The process of claim 1, wherein the esterification step comprises treatment with acetic anhydride, propionic anhydride, butyric anhydride, a mixed anhydride, and combinations thereof.

8. The process of claim 1, wherein said process is used to produce a cellulose acetate having a degree of substitution from about 0.1 to about 3 acetate groups per monomer unit.

9. The process of claim 1, wherein said process is used to produce cellulose diacetate, cellulose triacetate, fiber grade cellulose acetate, water-soluble cellulose acetate, or combinations thereof.

10. The process of claim 1, further comprising forming a fiber tow from said cellulose ester product.

11. The process of claim 1, further comprising incorporating said cellulose ester product in a composite matrix comprising one selected from the group consisting of a thermoplastic and a thermoset.

12. The process of claim 10, further comprising incorporating said cellulose ester tow in a composite matrix comprising one selected from the group consisting of a thermoplastic and a thermoset.

13. A process comprising:
   (a) moistening a cellulose sheet stock to a water content in a range from about 20% to about 50%;
   (b) attriting the moistened cellulose sheet to a wet pulp;
   (c) flash drying said wet pulp to a floccule of cellulose having a moisture content from about 5% to about 8%, wherein flash drying is conducted in a flash dryer having an inlet temperature of about 105° C. to about 200° C. and an outlet temperature of about 60° C. to about 130° C.;
   (d) esterifying said floccule of cellulose to provide a cellulose ester product; and
   (e) forming a fiber tow from said cellulose ester product.

14. The process of claim 13, wherein moistening said cellulose sheet comprises treatment with demineralized water.

15. The process of claim 13, wherein attriting comprises the steps of:
   shredding said cellulose sheet stock into small fragments; and
   attriting said small fragments into said wet pulp.

16. The process of claim 13, wherein flash drying is conducted with a low pressure hot gas, wherein said low pressure is in a range from between about 2 to about 4 psig.

17. The process of claim 13, wherein the flash drying step is conducted with air that is heated indirectly.

18. The process of claim 13, further comprising separating said floccule of cellulose in a cyclone separator.

19. The process of claim 13, wherein the esterification step comprises treatment with acetic anhydride, propionic anhydride, butyric anhydride, a mixed anhydride, and combinations thereof.

20. The process of claim 13, wherein said process is used to produce a cellulose acetate having a degree of substitution from about 0.1 to about 3 acetate groups per monomer unit.

21. The process of claim 13, wherein said process is used to produce cellulose diacetate, cellulose triacetate, fiber grade cellulose acetate, produce water-soluble cellulose acetate and combinations thereof.

22. The process of claim 13, further comprising incorporating said cellulose ester tow thereof in a composite matrix comprising one selected from the group consisting of a thermoplastic and a thermoset.

23. A process comprising:
   moistening a cellulose sheet stock to a water content of the cellulose sheet stock is about 20% to about 50%;
   attriting the moistened cellulose sheet to a wet pulp, wherein a water content of the wet pulp is about 20% to about 50%;
   delivering the wet pulp to a flash dryer;
   flash drying said wet pulp to a floccule of cellulose, wherein a water content of the flocculate of cellulose is about 4% to about 8%, and wherein the flash dryer has an inlet temperature of about 105° C. to about 200° C. and an outlet temperature of about 60° C. to about 130° C.; and
   esterifying said floccule of cellulose to provide a cellulose ester product.

* * * * *